US011620378B2

(12) United States Patent
Shaon et al.

(10) Patent No.: US 11,620,378 B2
(45) Date of Patent: Apr. 4, 2023

(54) SYSTEMS AND METHODS FOR PROACTIVE AND REACTIVE DATA SECURITY

(71) Applicant: Data Security Technologies LLC, Dallas, TX (US)

(72) Inventors: Fahad Shaon, McKinney, TX (US); Sazzadur Rahaman, Blacksburg, VA (US)

(73) Assignee: Data Security Technologies LLC, Dallas, TX (US)

(*) Notice: Subject to any disclaimer, the term of this patent is extended or adjusted under 35 U.S.C. 154(b) by 795 days.

(21) Appl. No.: 16/698,328

(22) Filed: Nov. 27, 2019

(65) Prior Publication Data

US 2021/0157906 A1  May 27, 2021

(51) Int. Cl.
*G06F 21/54* (2013.01)
(52) U.S. Cl.
CPC ........ *G06F 21/54* (2013.01); *G06F 2221/033* (2013.01)
(58) Field of Classification Search
CPC .. G06F 21/54; G06F 2221/033; G06F 21/562; G06F 21/566
See application file for complete search history.

(56) References Cited

FOREIGN PATENT DOCUMENTS

| CN | 109871681 A | * | 6/2019 | ............ G06F 21/54 |
| KR | 101383010 | * | 4/2012 | ............ G06F 21/54 |

* cited by examiner

*Primary Examiner* — Paul E Callahan
(74) *Attorney, Agent, or Firm* — Volpe Koenig P.C.; Daniel E. Rose

(57) ABSTRACT

Disclosed herein are systems, methods, and storage media for distributed system security. In an example embodiment, a computer-executable method includes receiving a first item of executable code, calculating a hash of the first item of executable code, and comparing the calculated hash to a database of hashes. Responsive to a determination that the calculated hash does not match any hash in the database of hashes, a first security policy is applied to the first item of executable code. Triggering of the first policy indicates that the first item of executable code should be blocked from execution. If the first item of executable code does not trigger the first security policy, the method includes executing the first item of executable code and intercepting a request initiated by the first item of executable code during execution. In the request matches a second security policy, the request is blocked and/or filtered or sanitized, based on attribute-based access control policies.

16 Claims, 6 Drawing Sheets

SYSTEMS AND METHODS FOR PROACTIVE AND REACTIVE DATA SECURITY

TECHNICAL FIELD

The present disclosure relates generally to systems and methods for preventing unauthorized data access in distributed systems, such as NoSQL and SQL databases.

BACKGROUND

In distributed systems and databases, users can access data by submitting user code written in a programming language and/or in a query language. The distributed system is structured to return the result to the user after executing the submitted code. The result, returned in response to a user code submission, may include data stored in the distributed databases.

When malicious code or an improper data request is submitted, access control mechanisms of a distributed database system may be circumvented by users seeking to gain unauthorized access. For example, a user can craft a data-analytic task to evade access-control methods by exploiting existing system application programming interfaces (APIs), by programmatically disabling security managers, or via runtime code injection and instrumentation. For example, in Java, the user by programmers of Reflection APIs, which can be used to alter the behavior of methods, classes, and interfaces at runtime, can enable unauthorized access and manipulation of internal properties of certain distributed data-analytic platforms. As another example, allowing a data-analytic job or task to override/disable existing security managers may enable a user to perform unauthorized, security-critical operations, such as tampering with the existing system, downloading and executing code from external sources, uploading data to external sources, etc. As another example, code injection and instrumentation into a data-analytic platform can enable access and alteration of a system's internal properties and behavior and evasion of existing security mechanisms in NoSQL or SQL databases. Code injection can occur at two levels: (1) loading and using malicious code as a library within a task; and (2) loading and using malicious code to alter the data-analytic platform's behavior. In distributed systems and databases, code injection can be performed using query languages, such as SQL.

SUMMARY

The systems and methods disclosed herein include a secure data access broker structured to override the default behavior of input and output message streams in distributed databases (e.g., NoSQL databases). In some embodiments, these overrides can be performed in response to code execution requests if it is determined that a particular code execution request does not comply with a predetermined security policy, does not include a whitelisted code library, etc.

The secure data access broker is embodied in a dual-layer defense architecture, which provides the technical benefit of a single-platform security system structured to address different types of intrusions. Examples of intrusions addressed by the secure data access broker disclosed herein include code injection requests, disabling existing security managers in NoSQL or SQL databases, adversarial use of existing APIs, etc.

One or more proactive analyzer circuits of the secure data access broker are structured to prevent malicious code from being executed by one or more nodes in distributed databases. For example, the one or more proactive analyzer circuits may be structured to execute computer-based operations. The computer-based operations may include operations to generate and store a hash of trusted user-submitted code archives to identify trusted (allowable) user-submitted code. Computer-based operations may further include operations to screen submitted code to detect dangerous API invocations, calls to framework-specific packages not intended to be called using external code, calls to restricted APIs, and/or calls to unsecured APIs.

Even if an intruder is able to bypass the proactive analyzer, the intruder can still be prevented from accessing sensitive data using the reactive analyzer of the secure data access broker disclosed herein. One or more reactive analyzer circuits of the secure data access broker are structured to monitor the execution stack trace for user-submitted code at runtime to identify method calls, as well as their inputs and outputs, and to block the calls and/or scrub, mask, or modify the inputs (function call parameters) or outputs (function call return values). For example, the one or more reactive analyzer circuits may be structured to prevent the execution of prohibited "write" commands on certain file structure elements and/or to prevent sensitive data from being included in output message streams.

One set of embodiments relates to a method for distributed system security. The method includes receiving, by a proactive analyzer executed by a processor of a computing device, a first item of executable code. The method includes calculating, by the proactive analyzer, a hash of the first item of executable code and comparing, by the proactive analyzer, the calculated hash to a database of hashes. The method includes determining, by the proactive analyzer, that the calculated hash does not match any hash in the database of hashes. The method includes, responsive to the determination that the calculated hash does not match any hash in the database of hashes, applying, by the proactive analyzer, a first security policy to the first item of executable code, triggering of the first policy indicating that the first item of executable code should be blocked from execution. The method includes determining, by the proactive analyzer, that the first item of executable code does not trigger the first security policy. The method includes executing, by the computing device, the first item of executable code, responsive to the determination that the first item of executable code does not trigger the first security policy. The method includes intercepting, by a reactive analyzer executed by the processor, a request initiated by the first item of executable code during execution. The method includes determining, by the reactive analyzer, that the request matches a second security policy and, responsive to the determination that the request matches the second security policy, blocking the request, by the reactive analyzer.

Another set of embodiments relates to a system for distributed system security. The system includes a computing device comprising a processor executing a proactive analyzer and a reactive analyzer. The proactive analyzer is configured to receive a first item of executable code, calculate a hash of the first item of executable code, compare the calculated hash to a database of hashes, determine that the calculated hash does not match any hash in the database of hashes, responsive to the determination that the calculated hash does not match any hash in the database of hashes, apply a first security policy to the first item of executable code, triggering of the first policy indicating that the first item of executable code should be blocked from execution, and determine that the first item of executable code does not trigger the first security policy. The reactive analyzer is configured to intercept a request initiated by the first item of executable code during execution, execution of the first item of executable code initiated responsive to the determination that the first item of executable code does not trigger the first security policy, determine that the request matches a second security policy, and responsive to the determination that the request matches the second security policy, block the request.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

These and other advantages and features of the systems and methods described herein, together with the organization and manner of operation thereof, will become apparent from the following detailed description when taken in conjunction with the accompanying drawings.

DETAILED DESCRIPTION

Figure 1:
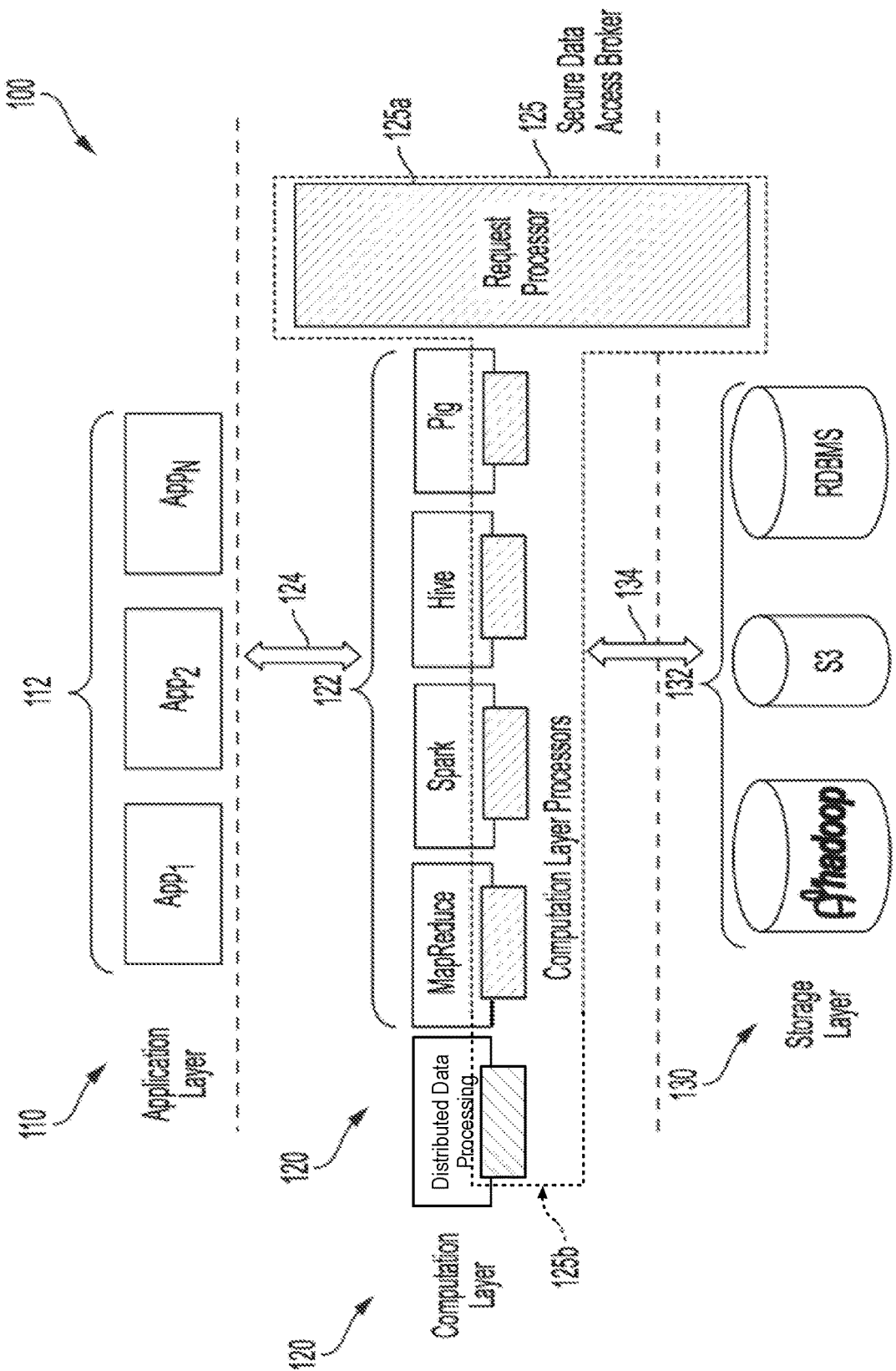
FIG. 1 is a block diagram of a distributed information system comprising a secure data access broker, according to an example embodiment.

In distributed systems and databases, users can access data by submitting user code written in a programming language and/or in a query language. The distributed system is structured to return the result to the user after executing the submitted code. The result, returned in response to a user code submission, may include data stored in the distributed databases.

When malicious code or an improper data request is submitted, access control mechanisms of a distributed database system may be circumvented by users seeking to gain unauthorized access. For example, a user can craft a data-analytic task to evade access-control methods by exploiting existing system application programming interfaces (APIs), by programmatically disabling security managers, or via runtime code injection and instrumentation.

For example, in Java, the user by programmers of Reflection APIs, which can be used to alter the behavior of methods, classes, and interfaces at runtime, can enable unauthorized access and manipulation of internal properties of certain distributed data-analytic platforms. As another example, allowing a data-analytic job or task to override/disable existing security managers may enable a user to perform unauthorized, security-critical operations, such as tampering with the existing system, downloading and executing code from external sources, uploading data to external sources, etc. As another example, code injection and instrumentation into a data-analytic platform can enable access and alteration of a system's internal properties and behavior and evasion of existing security mechanisms in NoSQL or SQL databases. Code injection can occur at two levels: (1) loading and using malicious code as a library within a task; and (2) loading and using malicious code to alter the data-analytic platform's behavior. In distributed systems and databases, code injection can be performed using query languages, such as SQL.

Distributed databases that do not include implementations of the systems and methods discussed herein cannot efficiently handle ad-hoc data transformation job requests (e.g., MapReduce requests, Spark requests, etc.). Further, these databases and accompanying systems cannot efficiently handle complex security in data sets received or generated responsive to potentially malicious user requests. Additionally, these databases and accompanying systems do not efficiently support multiple types of security, privacy, and governance-level controls. Further, these databases and accompanying systems do not efficiently support attribute-level access controls that may be required to comply with regulatory requirements, such as those of the General Data Protection Regulation (EU) (GDPR), Health Insurance Portability and Accountability Act (HIPAA), The Gramm-Leach-Bliley Act (GLBA), Fair Credit Reporting Act (FCRA), Telephone Consumer Protection Act (TCPA), etc.

In some embodiments, one or more proactive analyzer circuits of a secure data access broker disclosed herein may be structured to execute computer-based operations. The computer-based operations may include operations to generate and store a hash of trusted user-submitted code archives to identify trusted (allowable) user-submitted code. Computer-based operations may further include operations to screen submitted code to detect dangerous API invocations, calls to framework-specific packages not intended to be called using external code, calls to restricted APIs, and/or calls to unsecured APIs. In some embodiments, one or more reactive analyzer circuits of the secure data access broker are structured to monitor the execution stack trace for user-submitted code at runtime to identify method calls, as well as their inputs and outputs, and to block the calls and/or scrub, mask, or modify the inputs (function call parameters) or outputs (function call return values). For example, the one or more reactive analyzer circuits may be structured to prevent the execution of prohibited "write" commands on certain file structure elements and/or to prevent sensitive data from being included in output message streams.

Accordingly, the technological processes and particular technological embodiments described herein provide several technical benefits. For example, the secure data access broker of the present disclosure can be structured to override the default behavior of input and output message streams in distributed databases (e.g., NoSQL databases). These overrides can be performed in response to code execution requests if it is determined that a particular code execution request does not comply with a predetermined security policy, does not include a whitelisted code library, etc. The secure data access broker is embodied in a dual-layer defense architecture, which provides the technical benefit of a single-platform security system structured to address different types of intrusions (e.g., code injection requests, disabling existing security managers in NoSQL databases, adversarial use of existing APIs, etc.). One or more proactive analyzer circuits of the secure data access broker may include computer-executable code embodied in one or more request processors structured to prevent malicious code from being executed by one or more nodes in distributed databases. One or more reactive analyzer circuits of the secure data access broker may include computer-executable code embodied in one or more computation-layer processors structured to prevent sensitive data from being included in output message streams sent to user computing devices by the processors associated with nodes in distributed databases. Even if an intruder was able to bypass the proactive analyzer, the intruder can still be prevented from accessing sensitive data using the reactive analyzer.

Implementations of the proactive and reactive analyzers of the secure data access broker, as disclosed herein, may be instrumental in accomplishing some or all of the following: enforce fine-grained (e.g., key-value level) access control in data-analytic framework, prevent unauthorized access of data-analytic framework internals (e.g., by implementing a common API and/or defining framework-specific structures for executable code packages), prevent overrides and customization of security-related messages, prevent code injection and/or instrumentation, prevent execution of certain system commands that are not allowable, prevent transmission of data to certain remote hosts associated with originators of malicious requests, prevent file reading and writing data files into local file systems, and force the use of access-control protected data-analytic framework APIs. Additionally, one of skill will appreciate that machine learning capabilities of the intrusion detection learner circuit of the secure data access broker allow for a historical analysis of data. This allows data custodians and security providers in distributed systems to leverage the fine-grain log information, data type, and data sensitivity information to detect intrusions and perform comprehensive, automatic audits and data provenance generation.

Referring to the figures generally, systems, methods, and storage media for distributed system security are disclosed. In an example embodiment, a computer-executable method includes receiving a first item of executable code, calculating a hash of the first item of executable code, and comparing the calculated hash to a database of hashes. Responsive to a determination that the calculated hash does not match any hash in the database of hashes, a first security policy is applied to the first item of executable code. Triggering of the first policy indicates that the first item of executable code should be blocked from execution. If the first item of executable code does not trigger the first security policy, the method includes executing the first item of executable code and intercepting a request initiated by the first item of executable code during execution. If the request matches a second security policy, the request is blocked.

Referring now to FIG. 1, a block diagram of a distributed information system 100 comprising a secure data access broker 125a is shown, according to an example embodiment. Generally, the distributed information system 100 is structured to provide distributed data access and storage capabilities. As shown, the distributed information system 100 may include various system components, including, for example, applications, services, daemons, data storage entities, etc. These features are described in more detail below.

As shown, the distributed information system 100 includes three system architecture layers: the application layer 110, the computation layer 120, and the storage layer 130. The application layer 110 and/or computation layer 120 may be used by a bad actor to send malicious code intended to compromise security of the data and/or database structure of one or more underlying databases 132 of the storage layer 130. Accordingly, the secure data access broker 125a may be implemented as an intermediary interceptor and scrubber of such malicious code requests.

The application layer 110 includes one or more computer applications 112 that are structured to allow computer users to access data hosted and/or managed by the distributed information system 100. The applications 112 may include graphical user interfaces, system management tools (e.g., integrated development environments, query tools, system administration tools, system development tools, etc.), web pages, web applets, etc. Users utilize the input/output devices of their computing systems and devices (not shown) to use the functionality provided by the applications 112. As part of the functionality provided by the applications 112, users may submit one or more first electronic request messages 124 to retrieve and/or manipulate data from the underlying databases 132. The first electronic request messages 124 may be structured according to a variety of formats suitable to the structure and functionality of the applications 112. For example, the first electronic request messages 124 may be implemented as data queries, application programming interface (API) function calls, remote procedure function calls, executable code (e.g., JavaScript code), which may be embedded in web pages, etc. The electronic request messages 124 may include executable computer code structured to manipulate (access, modify, save, etc.) data in the underlying databases 132.

The computation layer 120 includes one or more executable code packages 122 that may embody software frameworks, services, daemons, applications, etc. structured to interface with the underlying databases 132. The executable code packages may be written in a suitable programming language, such as Java (e.g., .jar libraries), Python, Ruby, C++, etc. Examples of such executable code packages include computer-executable code to retrieve and transform data from the underlying databases 132. The executable code packages may include database commands, such as code that compiles to executable computer instructions, SQL commands, etc.

Generally, distributed data management environments may comprise a plurality of nodes, such as computing systems or processing clusters. In distributed data management environments, the executable code packages 122 may be installed and/or deployed (e.g., executable) at least in part on each node. One example of executable code packages 122 includes a distributed framework for processing large data sets on clusters, such as MapReduce. MapReduce may provide an API for manipulating data. The API for manipulating data may include computer-executable functions for input splitting, input mapping (e.g., data analysis functions), shuffling the output of input mapping (e.g., aggregation of the output of input mapping functions), and reducing (e.g., aggregating the output of the shuffling functions.)

The executable code packages 122 may include further executable code components, known as orchestrators, drivers, master nodes, etc., which are structured to coordinate processing distributed to the various nodes. One example of such coordinated processing includes coordination of job requests submitted by a user using one or more applications 112. A job or task may include one or more data access requests. Another example of coordinated processing includes file management functionality. For example, an executable code package 122 may be structured, in whole or in part, to alter a distributed file system of the underlying database 132 (e.g., a Hadoop Distributed File System (HDFS), etc.)

In some embodiments, the executable code packages 122 may include machine learning components and/or data integration components structured to access multiple underlying databases 132 (e.g., Spark, Couchbase, etc.). In some embodiments, the executable code packages 122 may include at least in part the applications 112 and may be structured as intermediaries for communication with other executable code packages 122. For example, an executable code package 122 may be embodied in a data access framework, such as Apache Hive, which may include an application 112 as a front end for parsing user-supplied SQL statements, generating and optimizing query execution plans, and translating execution plans into machine-executable instructions. The data access framework may further include computer-executable instructions to trigger the execution of code in another executable code package 122 for aggregating and manipulating the retrieved data, such as MapReduce. As another example, the executable code packages 122 may be structured to bypass MapReduce and similar data aggregation agents and instead provide a scripting interface (e.g., an application 112) structured to allow users to execute data manipulation code transmitted directly to the underlying databases 132. One such example is Apache Pig. In some embodiments, the scripting interface is integrated into a web service that is structured to allow the user to execute data retrieval and manipulation code from web applications.

The executable code packages 122, implemented at the computation layer 120 of the distributed information system 100, are structured to generate and send one or more second electronic request messages 134 to the underlying databases 132. The second electronic request messages 134 may be structured according to a variety of formats suitable to the structure and functionality of the underlying databases 132. The second electronic request messages 134 may include executable computer code structured to manipulate (access, modify, save, etc.) data in the underlying databases 132. One example of such a second electronic request message 134 is a MapReduce query. Generally, examples of second electronic request messages 134 include database commands to perform any of the following example functions: create a database, delete a database, create, update or delete a document, delete a document, batch create or fetch data objects, replicate and or synchronize data objects, create/query/manipulate indexes, retrieve data, update data, delete data, etc. In some embodiments, e.g. where the underlying databases 132 are NoSQL databases, the second electronic request message 134 may be implemented as a SQL command initially constructed using a JSON object. The JSON object may be coded by a user using the applications 112, generated by a web service, and/or generated by one or more executable code packages 122 at the computation layer 120.

The storage layer 130 includes one or more underlying databases 132. The one or more underlying databases 132 may be distributed or local databases. In an example embodiment, the underlying databases 132 are NoSQL databases (e.g., Hadoop, Cassandra, Cloudera, etc.). Further examples include NoSQL document stores (e.g., MongoDB), object databases, XML databases, etc. Further, one of skill in the art will appreciate that the teachings of the present disclosure may be applicable to any suitable computing environment that includes a database (e.g., a relational database management system (DBMS)) where a user can access and/or process data by submitting user code written in a programming language and/or in a query language and where the DBMS is structured to return the result to the user after executing the submitted code.

As shown, the secure data access broker 125 is implemented as an intermediary between the systems and computer-executable operations of the application layer 110 and the systems and computer-executable operations of the storage layer 130. Generally, the secure data access broker 125 may be structured to identify, modify and or block anomalous data requests, such as one or more first electronic request messages 124 and/or one or more second electronic request messages 134.

As shown, in some implementations, the secure data access broker 125 may include one or more request processors 125a and/or one or more computation-layer processors 125b. The structure and operation of the one or more request processors 125a and one or more computation-layer processors 125b are described further herein. Generally, the one or more request processors 125a comprise computer-executable instructions that embody one or more proactive analyzers discussed further herein. Proactive analyzers are structured to prevent malicious or harmful code from being executed. Accordingly, the one or more request processors 125a, which may include the functions of a proactive analyzer, are structured to provide the first layer of defense against malicious or harmful code and data requests received from a user or device via one or more applications 112.

More specifically, the one or more request processors 125a may be structured to execute computer-based operations. The computer-based operations include operations to generate and store a hash of trusted user-submitted code archives to identify trusted (allowable) user-submitted code. Computer-based operations further include operations to screen submitted code before execution using static analysis techniques, including detection of dangerous API invocations, detection of calls to framework-specific packages not intended to be called using external code, detection of restricted APIs, and rejection of the use of unsecured APIs.

The one or more computation-layer processors 125b comprise computer-executable instructions that embody one or more reactive analyzers discussed further herein. Reactive analyzers are structured to prevent sensitive data from being included in output message streams sent to user computing devices. The one or more computation-layer processors 125b are structured to provide the second layer of defense against malicious code, particularly in environments where bad actors take advantage of systems and functionality embodied in the executable code packages 122 at the computation layer 120.

For example, a bad actor may submit a malicious MapReduce request aimed at analyzing a plurality of consumer transactions to reduce the transaction data set to a set of unique credit card numbers. The computation-layer processors 125b may scrub the reduced data set generated based on data returned to the computation layer 120 by the underlying databases 132 and further processed by the executable code packages 122 to produce a list of unique credit card numbers. The computation-layer processors 125b may scrub the reduced data set and remove the unique credit card numbers before the reduced data set is returned to the user computing device via the application layer 110. The computation-layer processors 125b may be configured to replace sensitive data values in the reduced data set with masked values (e.g., with N number of character positions removed, names abbreviated to initials, etc.), de-identified values (e.g., with sensitive unique identifiers such as database identifiers, social security numbers, etc. replaced with randomly generated non-descriptive numerical or alphanumeric identifiers, which may include special characters), with null values, with blank spaces, etc.

Figure 2:
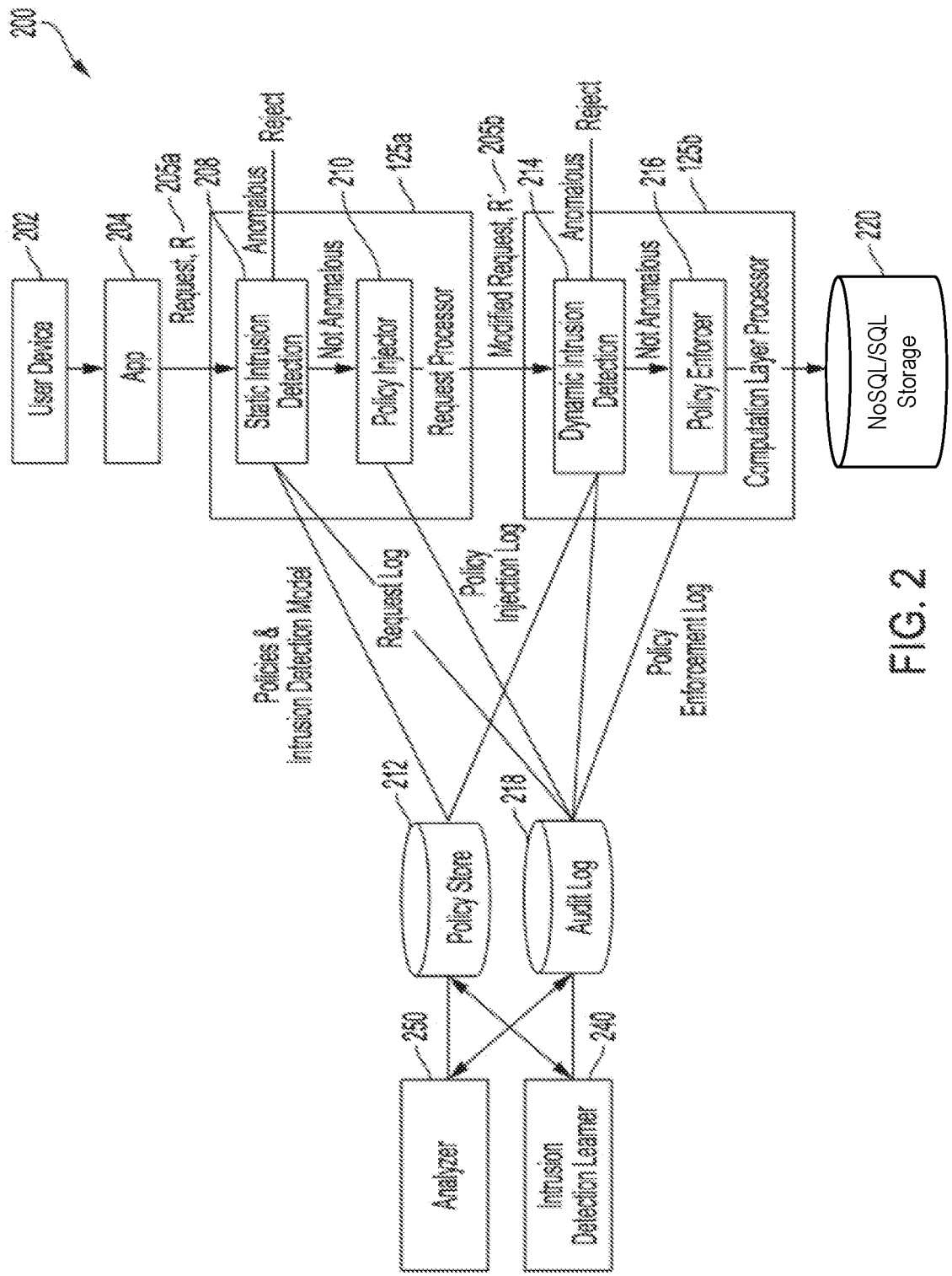
FIG. 2 is a process decomposition diagram for distributed system security management using the secure data access broker, according to an example embodiment.

Referring now to FIG. 2, a process decomposition diagram for a distributed system security management infrastructure 200 using a secure data access broker (such as the secure data access broker 125 of FIG. 1) is shown, according to an example embodiment. Generally, the distributed system security management infrastructure 200 is structured to intercept, modify, and/or block data access and analysis requests.

As shown, a user may submit code or a SQL query using the application 204 accessed by the user via the user device 202. For example, the user may submit a HiveQL request or another request written using a query language. As another example, a user may submit potentially malicious computer-executable instructions (such as code written in Java, Python, Scala, etc.) for data analysis, such as instructions for building machine learning models. The request is submitted by the user to the NoSQL/SQL database or other distributed database (referred to generally as database 220). Prior to the transmission of the user request to the database 220, the system security management infrastructure 200 is structured to intercept and, under certain conditions, block the request, modify the request, and/or return a modified data set to the user via, for example, a user interface associated with the application 204.

Figure 5B:
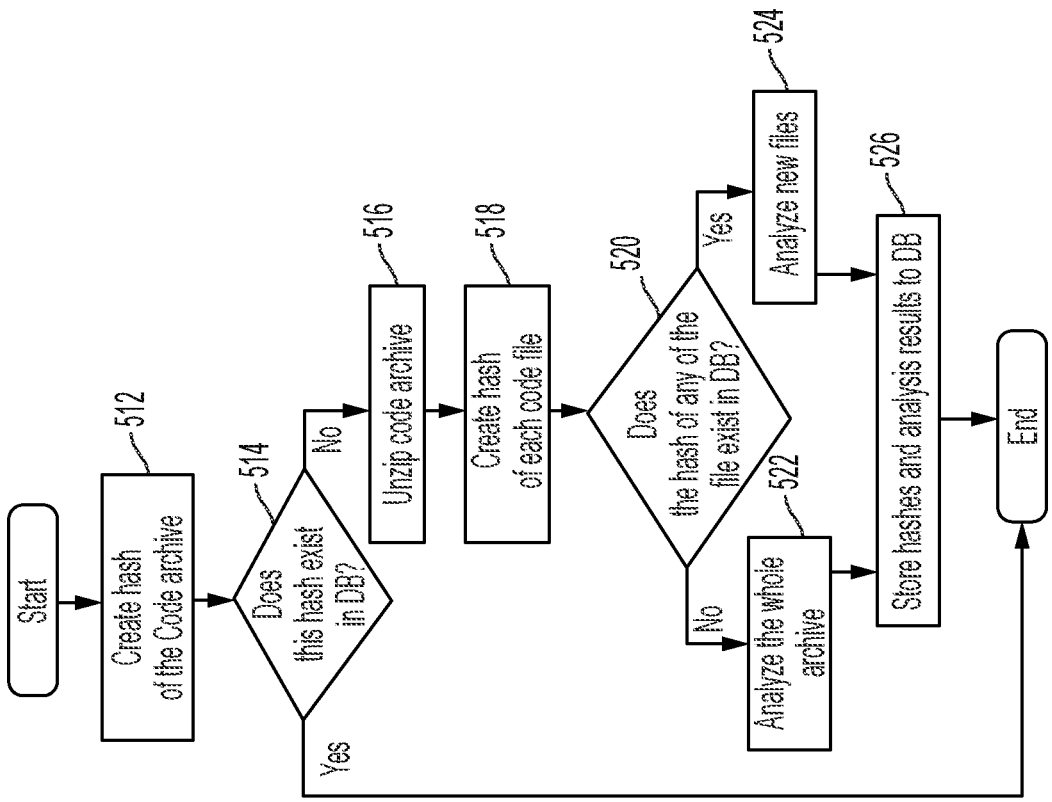
FIGS. 5A and 5B are flow diagrams including computer-based operations for data access management using the proactive analyzer, according to an example embodiment.
Figure 5A:
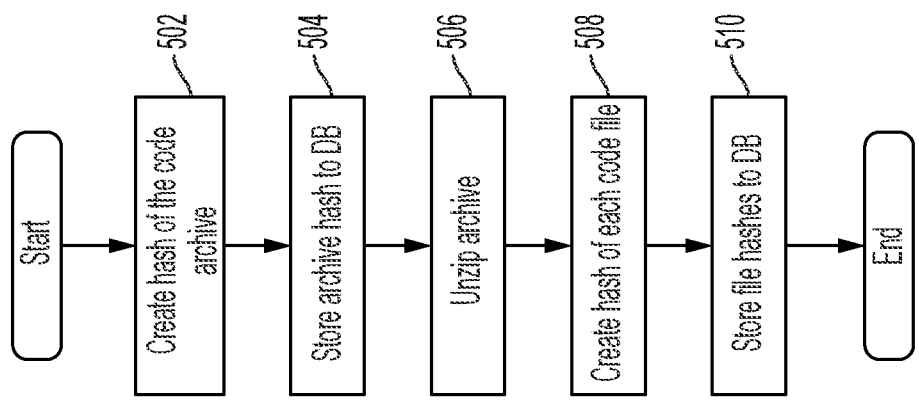
Figure 6:
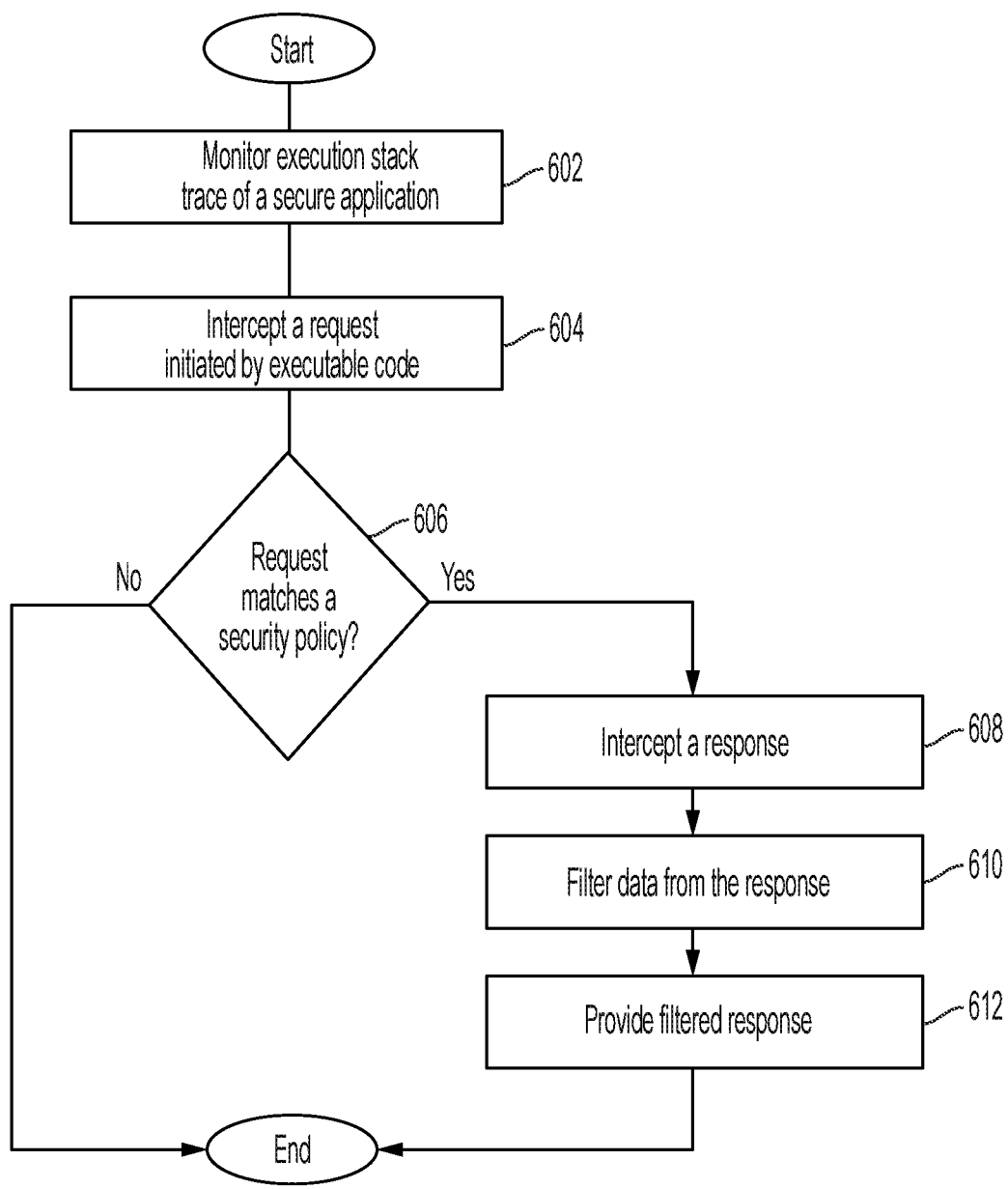
FIG. 6 is a flow diagram including computer-based operations for code instrumentation and data access management using the reactive analyzer, according to an example embodiment.

In an example embodiment, the request processor 125a and the computation-layer processor 125b may work in concert to block a user-submitted query at various stages of processing, as described further in reference to FIG. 5A, FIG. 5B and FIG. 6. According to one example, the submitted request 205a is first screened, using the request processor 125a, by leveraging the data sensitivity of the underlying data. If it is determined that the request 205a is written in a query language, the static intrusion detection module 208 may access a policy store 212 and retrieve a set of corresponding intrusion detection policies, as described in more detail in reference to FIG. 5B. The policy injector 210 may supplement the set of intrusion detection policies with information retrieved from a policy injection log and/or an audit injection log. Such information may be retrieved from the policy store 212 and/or the audit log store 218 and may comprise a result of machine learning operations performed by the intrusion detection learner 240 on historical intrusion data.

Additionally or alternatively, such information may include attribute and sensitivity information that corresponds to data requested in the query. For example, in response to determining that the request 205a includes a query for sensitive information (e.g., for a social security number field), the request processor 125a may automatically rewrite the query to exclude the request for the attributes (fields) that are not allowed to be retrievable. The request processor 125a may submit the modified request 205b to the computation-layer processor 125b. The policy enforcer 216 of the computation-layer processor 125b may be structured to access policy enforcement information from the policy store 212 and may determine the masking rules for the requested data. If the query was not rewritten by the request processor 125a to exclude the requested fields, the computation-layer processor 125b may apply the policy to use an appropriate format mask on the requested data or another appropriate policy such as those discussed in reference to FIG. 6. For example a user request may be blocked and discarded such that no data is returned.

In another example embodiment, query re-writing may not be possible where a user submits executable pre-compiled code. In such cases, it may not be possible to know which attributes will be included in the return data set until the code is executed. In such cases, the user-submitted job or task (e.g., the request 205a) is converted to byte code that is executed by the virtual machines running on the cluster nodes associated with the data storage 122. In such cases, the policy injector 210 may be structured to retrieve policy information from the policy store 212 and inject computer-executable code corresponding to the appropriate policy so as to generate the modified request 205b. In some embodiments, the computer-executable code corresponding to the appropriate policy is byte code generated using a .jar file stored in the policy store 212. For instance, the .jar file may be structured to substitute a list of production tables or views in a user-submitted query encoded in a job request with a list of dummy (decoy) tables or views such that an empty data set is returned in response to a malicious request. The modified request 205b is then executed by the computation-layer processor 125b or transmitted to its computation-layer counterpart (e.g., the executable code packages 122 of FIG. 1) for execution. In some embodiments, the user-submitted code is modified at the computation layer (e.g., by the computation-layer processors 125b) using code instrumentation techniques, as further described in reference to FIG. 6. For example, computer-executable code embedded within the computation layer may perform operations for dynamic intrusion detection by accessing the policy store 212 and determining, based on the policy data, allowable operations. Based on this determination, a "write" request submitted for execution by an executable code package 122 of FIG. 1 may be overridden by the policy enforcer 216 to remove the user-submitted parameters to the "write" request or blocked so that the user is not allowed to save data or files to the file system.

Figure 3:
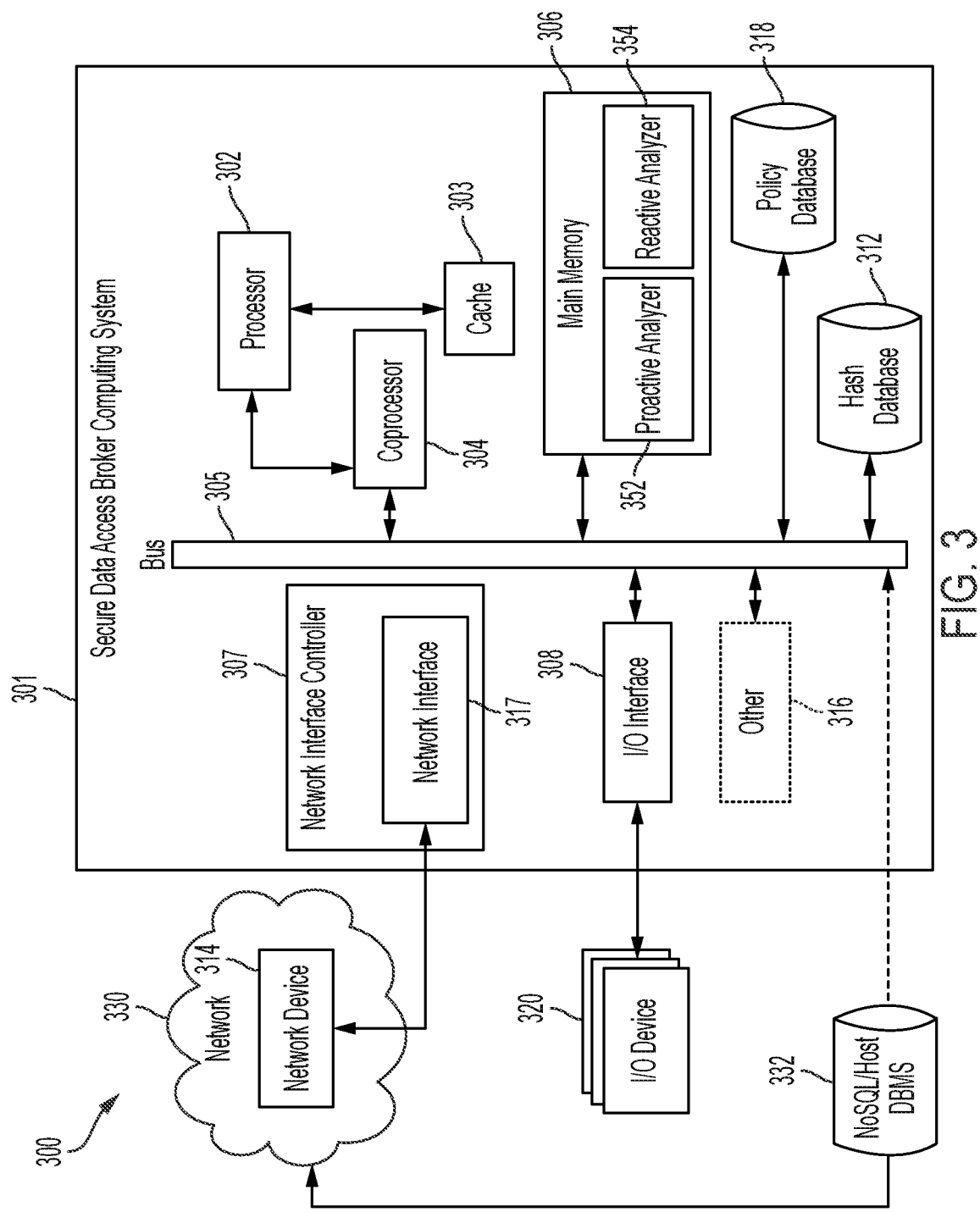
FIG. 3 is a block diagram of an example computing system that includes the secure data access broker, according to an example embodiment.

Referring now to FIG. 3, a block diagram 300 of an example secure data access broker computing system 301 is shown, according to an example embodiment. The secure data access broker computing system 301 is suitable for use in implementing the computerized components described herein, such as some or all components of the secure data access broker 125 of FIG. 1, in accordance with an illustrative implementation. In broad overview, the secure data access broker computing system 301 includes a processor 302 for performing actions in accordance with instructions, e.g., instructions held in cache memory 303. The illustrated example secure data access broker computing system 301 includes one or more processors 302 and coprocessors 304 in communication, via a bus 305, with main memory 306 comprising computer-executable code embodying the proactive analyzer 352 and the reactive analyzer 354, a network interface controller 307, an input/output (I/O) interface 308, and a data storage (e.g., a hash database 312, a policy database 318, a host DBMS 332, etc.). In some implementations, the secure data access broker computing system 301 may include additional interfaces or other components 316.

As shown, the main memory 306 includes the proactive analyzer 352 and the reactive analyzer 354. The proactive analyzer 352 is structured to screen user-submitted code to prevent, modify, or allow code execution. The computer-based operations of the proactive analyzer 352 include operations to generate and store a hash of trusted user-submitted code archives to identify trusted (allowable) user-submitted code. Computer-based operations further include operations to screen submitted code before execution using static analysis techniques, including detection of dangerous API invocations, detection of calls to framework-specific packages not intended to be called using external code, detection of restricted APIs, and rejection of the use of unsecured APIs. The reactive analyzer 354 is structured to monitor the execution stack trace for user-submitted code and identify method calls as well as their inputs and outputs, block the calls, and/or scrub, mask, or modify the inputs (function call parameters) or outputs (function call return values).

In some embodiments, other components represented by computer-executable instructions may be included in the main memory 306. For example, the request processor 125a and/or the computation-layer processor 125b of FIG. 1 may be stored, as computer-executable instructions, in main memory 306. According to various embodiments, some or all features of the request processor 125a and/or the computation-layer processor 125b of FIG. 1 may be included in the proactive analyzer 352 and/or the reactive analyzer 354. One such example embodiment is described relative to FIGS. 2 and 4; however, one of skill will appreciate that other arrangements suitable for practicing the principles disclosed herein are within the scope of the present disclosure.

In some implementations, a processor 302 can be configured to load instructions from the main memory 306 (or from data storage) into cache memory 303. Furthermore, the processor 302 can be configured to load instructions from cache memory 303 into onboard registers and execute instructions from the onboard registers. In some implementations, instructions are encoded in and read from a read-only memory (ROM) or from a firmware memory chip (e.g., storing instructions for a Basic I/O System (BIOS)), not shown.

As shown, the processor 302 is connected to the cache memory 303. However, in some implementations, the cache memory 303 is integrated into the processor 302 and/or implemented on the same circuit or chip as the processor 302. Some implementations include multiple layers or levels of cache memory 303, each further removed from the processor 302. Some implementations include multiple processors 302 and/or coprocessors 304 that augment the processor 302 with support for additional specialized instructions (e.g., a math coprocessor, a floating point coprocessor, and/or a graphics coprocessor). As shown, the coprocessor 304 is closely connected to the processor 302. However, in some implementations, the coprocessor 304 is integrated into the processor 302 or implemented on the same circuit or chip as the processor 302. In some implementations, the coprocessor 304 is further removed from the processor 302, e.g., connected to the bus 305.

The network interface controller 307 can be configured to control one or more network interfaces 317 for connection to network devices 314 (e.g., for access to a network 330). The I/O interface 308 can be configured to facilitate sending and receiving data to various I/O devices 320 such as, but not limited to, keyboards, touch screens, microphones, motion sensors, video displays, speakers, haptic feedback devices, printers, and so forth. In some implementations, one or more of the I/O devices 320 are integrated into the secure data access broker computing system 301. In some implementations, one or more of the I/O devices 320 are external to, and separable from, the secure data access broker computing system 301.

In some implementations, the secure data access broker computing system 301 is implemented using special purpose logic circuitry, e.g., an application-specific integrated circuit (ASIC) or a system on a chip (SoC) semiconductor device that includes the processor 302 and one or more additional components, e.g., the cache memory 303, network interface controller 307 and network interface 317, and one or more I/O interfaces 308.

The processors 302 can be any logic circuitry that processes instructions, e.g., instructions fetched from the cache memory 303, main memory 306, data storage (e.g., hash database 312, policy database 318, etc.), or other memory not shown. The processor 302 includes a number of data and instruction registers. In some implementations, on start-up (boot), the processor 302 can be configured to load initial instructions from a BIOS into the registers, including instructions for loading more instructions, and execute instructions from the registers. In some implementations, the BIOS instructions cause the processor 302 to load an operating system (OS), which in turn causes the processor 302 to load and execute one or more programs.

The processors 302 may be augmented by one or more ancillary coprocessors 304, which are auxiliary processing units with specialized instruction sets for specific purposes. In some implementations, the processor 302 faced with an unrecognized instruction will pass the instruction to the coprocessor 304, e.g., via a special bus, and only generate an un-recognized instruction fault if the coprocessor 304 also does not recognize the instruction. The processors 302 and coprocessors 304 may each be single-core or multi-core processor(s).

The secure data access broker computing system 301 may include multiple distinct processors 302 and/or multiple distinct coprocessors 304. For example, in some implementations, a general purpose processor 302 such as a multi-core central processing unit (CPU) may be augmented with one or more special purpose coprocessors 304, such as a math coprocessor, floating point coprocessor, or a graphics processing unit (GPU). For example, a math coprocessor 304 can assist the processor 302 with high precision or complex calculations. In some implementations, the processor(s) 302 and coprocessors 304 are implemented as circuitry on one or more chips. The secure data access broker computing system 301 may be based on any processor 302, or set of processors 302 and/or coprocessors 304, capable of operating as described herein.

The cache memory 303 is generally a form of computer memory placed in close proximity to a processor 302 for fast access times. In some implementations, the cache memory 303 is memory circuitry that is part of, or on the same chip as, a processor 302. In some implementations, there are multiple levels of cache memory 303, e.g., L2 and L3 cache layers. In some implementations, multiple processors 302, and/or multiple cores of a processor 302, share access to the same cache memory 303.

The main memory 306 may be any device suitable for storing computer readable data. The main memory 306 is a device that supports direct access to specified addresses; i.e., the main memory 306 is random access memory (RAM). In some implementations, the main memory 306 is a volatile semiconductor memory device such as dynamic random-access memory (DRAM), synchronous dynamic random-access memory (SDRAM), double data rate SDRAM (DDR SDRAM), static random-access memory (SRAM), T-RAM, Z-RAM, and so forth. The secure data access broker computing system 301 may have any number of devices serving as main memory 306.

Still referring to FIG. 3, the bus 305 is an interface that provides for data exchange between the various internal components of the secure data access broker computing system 301, e.g., connecting the processor 302 to the main memory 306, the network interface controller 307, the I/O interface 308, and data storage 909. In some implementations, the bus 305 further provides for data exchange with one or more components external to the secure data access broker computing system 301, e.g., other components 316, the host DBMS 332, etc. In some implementations, the bus 305 includes serial and/or parallel communication links. In some implementations, the bus 305 implements a data bus standard such as integrated drive electronics (IDE), peripheral component interconnect express (PCI), small computer system interface (SCSI), or universal serial bus (USB). In some implementations, the secure data access broker computing system 301 has multiple busses 305.

The secure data access broker computing system 301 may include, or provide interfaces 308 for, one or more input or output (I/O) devices 320. The I/O devices 320 include input devices such as, without limitation, keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers.

The network 330 enables communication between various nodes such as the secure data access broker computing system 301 and a network device 314. In some implementations, data flows through the network 330 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 330 layered over an OSI layer-3 network protocol such as Internet Protocol (IP), e.g., IPv4 or IPv6. The network 330 is composed of various network devices (nodes) linked together to form one or more data communication paths between participating devices. Each networked device includes at least one network interface for receiving and/or transmitting data, typically as one or more data packets. An illustrative network 330 is the Internet; however, other networks may be used. The network 330 may be an autonomous system (AS), i.e., a network that is operated under a consistent unified routing policy (or at least appears to from outside the AS network) and is generally managed by a single administrative entity (e.g., a system operator, administrator, or administrative group).

The network 330 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 330 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 330 may be any combination of physical links (e.g., fiber optic, mesh, coaxial, twisted-pair such as Cat-5 or Cat-6, etc.) and/or wireless links (e.g., radio, satellite, microwave, etc.).

The network 330 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation 3G, 4G, and 5G protocols. The network 330 can include short-range wireless links, e.g., via Wi-Fi, BLUETOOTH, BLE, or ZIGBEE, sometimes referred to as a personal area network (PAN) or mesh network. The network 330 may be public, private, or a combination of public and private networks. The network 330 may be any type and/or form of data network and/or communication network.

The network interface controller 307 manages data exchanges with devices in the network 330 (e.g., the network device 314) via the network interface 317 (sometimes referred to as a network interface port). The network interface controller 307 handles the physical and data link layers of the Open Systems Interconnection (OSI) model for network communication. In some implementations, some of the network interface controller's tasks are handled by the processors 302 and/or coprocessors 304. In some implementations, the network interface controller 307 is incorporated into the processor 302, e.g., as circuitry on the same chip. In some implementations, a secure data access broker computing system 301 has multiple network interfaces 317 controlled by a single controller 307. In some implementations, a secure data access broker computing system 301 has multiple network interface controllers 307. In some implementations, each network interface 317 is a connection point for a physical network link (e.g., a Cat-5 Ethernet link). In some implementations, the network interface controller 307 supports wireless network connections and an interface 317 is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In some implementations, the network interface controller 307 implements one or more network protocols such as Ethernet. Generally, the secure data access broker computing system 301 can be configured to exchange data with other computing devices via physical or wireless links through a network interface 317. The network interface 317 may link directly to another device or to another device via an intermediary device, e.g., a network device 314 such as a hub, a bridge, a switch, or a router, connecting the secure data access broker computing system 301 to the network 330.

The network device 314 may be a hub, switch, router, modem, network bridge, another secure data access broker computing system 301, or any other network node. In some implementations, the network device 314 is a network gateway. In some implementations, the network device 314 is a routing device implemented using customized hardware such as a special purpose processor and/or a ternary content-addressable memory (TCAM).

The other components 316 may include an alternative I/O interface, external serial device ports, and any additional coprocessors 304 that are connected via the bus 305. For example, a secure data access broker computing system 301 may include an interface (e.g., a universal serial bus (USB) interface) for connecting external input devices, output devices, or additional memory devices (e.g., portable flash drive or external media drive).

The illustrated secure data access broker computing system 301 is suitable for implementing systems that manage or organize data. For example, in some implementations, the secure data access broker computing system 301 hosts one or more local or distributed databases. As shown, the hash database 312, policy database 318, and host DBMS 332 are implemented as data storage components and/or devices.

The hash database 312 is structured to store hashes of code that is allowable for execution. The policy database 318 is structured to store criteria for code screening (e.g., permissions, allowable function parameters, etc.) and result set screening (e.g., restricted views, tables, attributes, values, etc.) The host DBMS 332 is structured to provide data-analytic services accessible to users.

The present disclosure relates to securing data hosted in the host DBMS 332. In some embodiments, the host DBMS 332 is part of the secure data access broker computing system 301 such that the DBMS shares one or more of the processor 302, coprocessor 304, cache 303, memory 306, and network interface controller 307 with other components of the secure data access broker computing system 301. In some embodiments, the computer-executable instructions embodied in the proactive analyzer 352 and the reactive analyzer 354 are a component of the host DBMS 332. In other embodiments, the host DBMS 332 has its own dedicated processors, memory, cache, and network interface controller and communicates with the components of the secure data access broker computing system 301 by exchanging electronic messages via the network 330.

More generally, the data storage described in reference to FIG. 3 may be any device suitable for storing computer readable data between power cycles. In some implementations, the data storage is a device with fixed storage media, such as magnetic disks, e.g., a hard disk drive (HDD). In some implementations, the data storage is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the data storage is a non-volatile semiconductor memory device such as an erasable programmable read-only memory (EPROM), electrically erasable programmable read-only memory (EPROM), or Flash memory. In some implementations, the main memory is a solid-state drive (SSD), e.g., using multi-level cell (MLC) NAND-based Flash memory. A secure data access broker computing system 301 may have any number of devices serving as data storage.

Generally, a database, or more specifically a database management system (DBMS), organizes data in accordance with a database definition, e.g., a database schema. For example, in a relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In some implementations, a column represents structured data grouping multiple data elements into a single column. In a relational database, each entry in a column in a table is also in a row associating the entry with entries from other columns in the table.

In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language (XML) databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity, consistency, isolation, and durability. These properties are known by the acronym ACID. In some implementations, a DBMS provides all of the ACID properties. However, in some implementations, the DBMS does not provide all of the ACID properties.

In some implementations, one or more clients devices, e.g., instances of the secure data access broker computing system 301, are in communication with the DBMS (e.g., the host DBMS 332), e.g., via a direct link or via the network 330. In some implementations, one or more of the clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the clients obtain data from the DBMS using natural language or semantic queries. In some implementations, one or more of the clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 302). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

Figure 4:
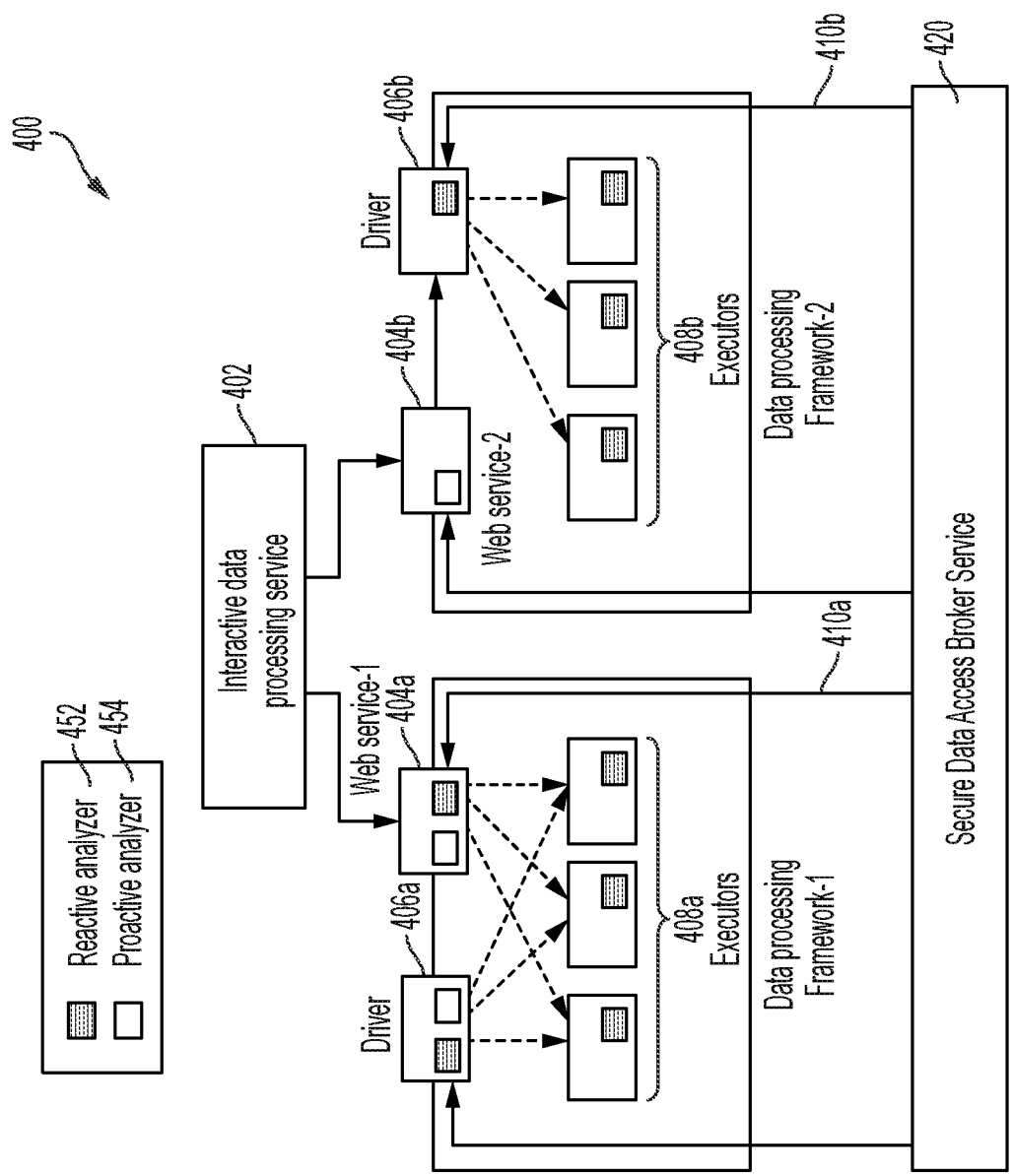
FIG. 4 is a process decomposition diagram for distributed system security management using a proactive analyzer and a reactive analyzer circuits of the secure data access broker, according to an example embodiment.

Referring now to FIG. 4, a process decomposition diagram for a distributed system security management infrastructure 400 is shown, according to an example embodiment. The distributed system security management infrastructure 400 includes proactive and reactive analyzers.

Generally, in distributed systems, a driver, also sometimes referred to as a master node, is a node that may comprise or have access to a processor and memory, the memory comprising computer-executable instructions that cause the driver to receive a job or task submitted by a user via a user computer device using an application front-end, such as the interactive data processing service 402, and to distribute the job or task to one or more executor nodes, also sometimes referred to as worker nodes. Generally, a job contains computer-executable code and/or queries. A job can be implemented as a precompiled code package, a code archive (e.g., a .jar), as a code snippet, or via an API, such as a Java client API, a Scala client API, etc. The job submission may be further coordinated by a web service node. For example, a web service node may include computer-executable code embodying an interface engine, such as a REST interface engine, or an API, such as a remote procedure call (RPC) library. The interface engine is structured to enable submission of jobs from web-based user interfaces/applications, mobile applications, etc. In some embodiments, any of the web service node, the driver node, and/or the front-end application may be integrated. For example, they may be hosted on a single physical device or appear to be part of a single virtual device in virtualized computing environments.

As shown, the distributed system security management infrastructure 400 includes the interactive data processing service 402, the first web service 404a, the second web service 404b, the first driver 406a, the second driver 406b, the first plurality of executors 408a, and the second plurality of executors 408b. The first web service 404a, the first driver 406a, and the first plurality of executors 408a comprise the first data processing framework 410a. The second web service 404b, the second driver 406b, and the second plurality of executors 408b comprise the second data processing framework 410b. Each of the data processing framework 410a and the second data processing framework 410b includes or is connected to the secure data access broker service 420, which may include some or all components shown, for example, in FIG. 3 and structured to perform computer-executable operations.

The distributed system security management infrastructure 400 includes the proactive analyzer 452 and the reactive analyzer 454 circuits of a secure data access broker, such as the secure data access broker 125 of FIG. 1. The proactive analyzer 452 is structured to prevent malicious code from being executed by one or more nodes in the underlying distributed database. As shown, the proactive defense operations implemented by the proactive analyzer 452 can employ code scrubbing. The reactive analyzer 454 is structured to prevent sensitive data from being included in output message streams sent to user computing devices and may be structured to use code instrumentation to accomplish this task. In an example embodiment, the proactive analyzer 452 and reactive analyzer 454 are implemented as computer-executable code installed or executable on various components of the distributed system security management infrastructure 400. In some embodiments, the proactive analyzer 452 and reactive analyzer 454 are implemented in an aspect-oriented programming (AOP) fashion (e.g., using AspectJ, etc.). For example, the proactive analyzer 452 and reactive analyzer 454 may be implemented as computer-executable code sets (e.g., .jar files, byte code, etc.) structured to extend and/or overload (override the behavior of) the computer-executable operations of corresponding code packages included in the distributed system security management infrastructure 400. The corresponding computer-executable code packages may include standard computer-executable code packages 122 structured to support operations of a distributed database, as described in reference to FIG. 1. Correspondingly, as shown in FIG. 4, the computer-executable code embodying the proactive analyzer 452 and reactive analyzer 454 may be installed and/or executable of any of the driver nodes, web services nodes, or executors shown in FIG. 4.

The distributed system security management infrastructure 400 includes the secure data access broker service 420, which is structured to update and manage the policies and configurations (e.g., data and/or data stores, such as those described in reference to FIG. 2 and FIG. 3) accessible to the proactive analyzer 452 and the reactive analyzer 454 circuits.

A non-limiting list of examples of the systems of FIG. 4 in operation, according to some arrangements, follows.

In one example, the first data processing framework 410a is Apache Spark. The first data processing framework 410a includes a plurality of first drivers 406a and a first plurality of executors 408a. The jobs are organized according to Spark contexts. A Spark context coordinates the execution of submitted jobs and provides an execution environment, which may include computer-executable code embodying a task scheduler, a listener, a database manager (e.g., a Resilient Distributed Database (RDD) manager), etc. After a job submission, the first driver 406a accepts the user-submitted code. The first driver 406a then creates a SparkContext within itself, which prepares and sends specific tasks to the first plurality of executors 408a. In some embodiments, users submit code via a web-based interactive data processing service 402, such as Zeppelin. The user code is transmitted, via electronic messages, to the first web service 404a, such as Livy. Livy comprises an open-source REST interface for interacting with Spark. In this setting, Livy integrates the functions of the driver 406a and supports executing snippets of code or the entire user-submitted program. The proactive analyzer 452 is structured to intercept the REST messages on Livy and screen the user-submitted code as described, for example, in reference to FIGS. 5A and 5B before the code is executed. The reactive analyzer 454 is structured to set up AOP-based fine-grained access control and a security manager to check the user's access/execution privileges and other relevant data access policies at runtime and, if necessary, scrub the return data set, as described, for example, in reference to FIG. 6.

In another example, the second data processing framework 410b is Apache Hive. The second data processing framework 410b includes a second driver 406b and a second plurality of executors 408b. In Apache Hive, a user submits SQL queries to access data stored in various distributed databases and file systems. Hive uses Thrift servers (shown as the second web service 404b) to receive SQL queries and send the same to the 406b. The driver 406b is structured to parse the query and create an execution plan. The driver 406b is structured to send various tasks to the second plurality of executors 408*b* in order to execute the query. In this setting, users can submit code in the form of user-defined function (UDF) so as to create easy-to-reuse custom functions to process data records. The proactive analyzer 452, deployed on the Thrift server, is structured to parse and screen these UDF functions and the corresponding code when they are submitted as described, for example, in reference to FIGS. 5A and 5B, before the code is executed. The reactive analyzer 454 is structured to implement, at runtime, program instrumentation based fine-grained access control and security manager-based runtime privilege checking on both the second driver 406*b* and the second plurality of executors 408*b*, as described, for example, in reference to FIG. 6.

In another example, the second data processing framework 410*b* is Apache Hadoop. The second data processing framework 410*b* includes a second driver 406*b* and a second plurality of executors 408*b*. In Apache Hadoop, the second driver 406*b* receives map-reduce tasks, negotiates resources with a resource manager application or service and distributes the tasks to the second plurality of executors 408*b* by using computer-executable code embodying node managers. Node managers launch containers (e.g., initialize or activate the second plurality of executors 408*b*) in order to execute the tasks. On the second driver 406*b*, the proactive analyzer 452 is structured to screen the user-submitted code as described, for example, in reference to FIGS. 5A and 5B before the code is executed. The reactive analyzer 454 is structured to implement, at runtime, program instrumentation based fine-grained access control and security manager-based runtime privilege checking on both the second driver 406*b* and the second plurality of executors 408*b*, as described, for example, in reference to FIG. 6.

FIGS. 5A and 5B are flow diagrams including computer-based operations for data access management using a proactive analyzer, such as the proactive analyzer 352 shown in FIG. 3 or proactive analyzer 452 shown in FIG. 4, according to an example embodiment. As an overview, the computer-based operations include operations to generate and store a hash of trusted user-submitted code archives to identify trusted (allowable) user-submitted code. Computer-based operations further include operations to screen submitted code before execution using static analysis techniques, including detection of dangerous API invocations, detection of calls to framework-specific packages not intended to be called using external code, detection of restricted APIs, and rejection of the use of unsecured APIs.

Referring now to FIG. 5A, a computer-implemented method to generate and store a hash of trusted user-submitted code archives is shown, according to an example embodiment. Various third-party libraries use Java Reflection APIs to offer convenience to users (e.g., they allow to modify default behavior of Java classes). Not all of this code is malicious. If a code analysis engine blindly rejects a job on finding Java Reflection API invocation, a legitimate user using such libraries will be impacted. To solve this problem, the method of FIG. 5A implements whitelisting operations for computer-based code. The method is designed to skip screening a user-submitted .jar or a class binary file if the file is white-listed. The inventors created a list of common libraries that are white-listed by default, and the list can be extended or modified by an administrator at any time. The white-listed .jar code and hashes of the same can be stored in a data store communicatively coupled to a proactive analyzer engine, such as the hash database 312 of FIG. 3.

In operation, to white-list a .jar according to an example embodiment, at 502, a hash of a code archive or a plurality of hashes of the files included in the archive are created. One of skill will appreciate that any suitable hashing algorithm can be used. At 504, the hash is stored in a hash database, such as the hash database 312. The stored hash corresponds to a white-listed code package. In some embodiments, the stored hash can be stored relationally to user- or device-identifying information, such as a user identifier, an IP address, an IP subnet, a MAC address, etc. In this fashion, code packages can be made allowable for execution by some but not all users. As users submit new allowable jobs for execution, the code may be submitted in a compressed form (e.g., as a .zip file). At 506, the code archive is decompressed and a set of code files submitted for execution is extracted. At 508, a hash of each code file is created, and, at 510, the file hash is stored in the hash database, such as the hash database 312.

Referring now to FIG. 5B, a computer-implemented method to detect malicious code is shown, according to an example embodiment. Generally, the method of FIG. 5B includes computer-executable instructions for performing static analysis on submitted code before execution.

In operation, a new code submission containing a code archive (e.g., a .jar file) is received by a proactive analyzer module, such as the proactive analyzer 352 of FIG. 3. A hash of the code archive or submitted code (e.g. .jar file) is created at 512. At decisional 514, the proactive analyzer is structured to execute operations to retrieve a list of hashes from a hash database, such as the hash database 312 of FIG. 3. In some embodiments, the proactive analyzer is structured to parse an electronic message that includes the code submission to identify user- or device-specific information and to search the hash database for a corresponding hash of white-listed code using this additional information instead of or in addition to using the hash of the code archive or submitted code.

If the determination at decisional 514 is positive (that is, if a match is found in the hash database such that the submitted archive corresponds to a white-listed entry), the submitted code archive is considered allowable for execution. In some embodiments, the output and/or the result set corresponding to the submitted code archive may be further screened at runtime using a reactive analyzer, such as the reactive analyzer 354 of FIG. 3.

If the determination at decisional 514 is negative (that is, if a match is not found in the hash database such that the submitted archive contains potentially malicious or unsafe code), the submitted code archive is further screened. In some embodiments, the screening is performed by computer-executable code embodying a policy injector, such as the policy injector 210 of FIG. 2. The policy injector may be structured to access various databases, such as the policy database 318 of FIG. 3, to retrieve corresponding criteria for code screening. At 516, the code archive is decompressed and individual code files (e.g., class files) are extracted. At 518, a hash of each class file is created and, at 550-524, the method proceeds to either screen the entire archive if none of the new hashes correspond to any whitelisted entries or to screen only the files without corresponding entries in the hash database.

The screening of user-submitted code is performed at 524. The screening is embodied in a set of computer-executable operations of a proactive analyzer, such as the proactive analyzer 352 of FIG. 3 and/or of a component thereof, such as the policy injector 210 of FIG. 2. Each submitted code file (e.g., a class file) is programmatically screened using the criteria retrieved from the policy database. During screening operations, the submitted code file may be parsed to identify the variables, methods, functions, class initializations, etc. used in the code and their corresponding parameters.

In some embodiments, the screening operations at 524 include detection of dangerous API invocations (e.g., class initializations, method or function calls, etc.). Some system libraries, such as such Java Reflection, allow developers to modify the behavior of methods, classes and interfaces at runtime. The screening operations at 542 are structured to detect whether the input parameters passed to the dangerous API invocations are influenced by any object that is obtained/derived from data-analytic framework itself or is security-sensitive.

In some embodiments, backward data flow analysis methods may be used to build a tree of successive function calls, their inputs, and their outputs. In some embodiments, the screening operations at 524 include detection of framework-specific packages. Some frameworks (e.g., Apache Spark) define APIs that are intended to be used only by the framework itself. Generally, these APIs are defined as package private, so that they become invisible to the classes that are external to the framework. However, a user can define classes with the framework-specific package structure so that the framework internal APIs become accessible. By using regular expressions (e.g., any of a predetermined set of characters, delimiters, wildcards, etc. that define various search patterns), the screening operations at 524 are structured to find the calls to framework-specific packages within the submitted code and block the corresponding user-submitted job or task.

In some embodiments, the screening operations at 524 include detection of restricted APIs. In some embodiments, user-submitted code may be blocked from execution if the code attempts to invoke APIs to perform any of the following example operations: (1) load classes dynamically; (2) override security manager, which may be indicative of a potentially unsafe use of the Java Reflection API or similar to override behavior of existing classes; (3) use aspect oriented programming, which also allows users to override behavior of classes; (4) execute system commands; (5) create remote connections, etc.

In some embodiments, the screening operations at 524 include rejection of the use of unsecured APIs such that the users are forced to use only secured APIs provided by the underlying data-analytic framework.

At 526, if it is determined that the screened code is allowable for execution, the hash(es) corresponding to the code may be stored in the hash database such that they become whitelisted for future code executions. Advantageously, whitelisting reduces the amount of processing resources needed to perform or block a code execution request. Additionally, in some embodiments, the proactive analyzer is structured to maintain a cache of screened code. If the screening results of a .jar or a class are available in the screening cache (e.g., cache 303 of FIG. 3), then for subsequent code submissions, results can be retrieved from the cache such that operations at 520-526 can be skipped.

Referring now to FIG. 6, a flow diagram including computer-based operations for code instrumentation and data access management using a reactive analyzer, such as the reactive analyzer 354 shown in FIG. 3, is shown, according to an example embodiment. Generally, the method of FIG. 6 includes computer-executable instructions for performing dynamic analysis on submitted code at runtime. For example, the method of FIG. 6 may include operations to monitor the execution stack trace for user-submitted code to identify method calls as well as their inputs and outputs and to block the calls and/or scrub, mask, or modify the inputs (function call parameters) or outputs (function call return values).

At 602, the execution stack trace is monitored. The computer-executable operations for monitoring the execution stack trace may include accessing one or more log files generated by the underlying data-analytic framework or by an add-on stack trace analyzer tool, such as the audit log 218 of FIG. 2. The log file may be parsed to identify and intercept, at 604, a request or a portion thereof (e.g., a function call, class initialization, API invocation, file system command, SQL query, etc.). Generally, a request is a computer-executable command submitted by a user, through computer-executable code, for execution by one or more components of the data-analytic framework.

At decisional 606, a determination is made whether the request matches a security policy retrieved from a security policy store, such as the policy store 212 of FIG. 2. Generally, a security policy is an electronic record that may contain access specifications, which may be conceptualized as permissions to access a particular system resource. In some embodiments, a security policy contains a set of access permissions for the underlying data, which may be view-level, table-level, attribute-level, etc. The access permissions may be configured globally or locally by user, device, subnet, etc. In some embodiments, the security policy contains a set of access permissions for the underlying API functions. In some embodiments, access permissions may be structured to prohibit API invocations, to block write/execution/remote connection commands, and/or to block modification to existing policies set by the security-manager service of the underlying data-analytic framework, of the runtime environment (e.g., Java virtual machine), of the operating system, etc.

If the determination made at decisional 606 is negative (that is, it is determined that no security policies were violated), the submitted code archive is considered allowable for execution and the result set (e.g., a query result set, a MapReduce result set, etc.) is returned to the user unaltered.

If the determination made at decisional 606 is positive, the request or the result set (e.g., a response intercepted at 608) may be modified or blocked. For example, in one embodiment, a parameter in the request (e.g., "write" instructions for specific data or file system, remote host connection instructions, etc.) may be removed using code instrumentation such that the request fails and an error message is returned to the user by the runtime environment. In another embodiment, at 610, values in a result data set may be scrubbed, masked, de-identified, etc. Filtering may be performed on any type of results or portion of a result data set, such as filtering text, relational data, and/or non-relational data. The filtered response is then returned to the user at 612. In yet another embodiment, the request may be blocked such that a result set is not returned to the user.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" (e.g., "engine") may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for distributed system security, comprising:
receiving, by a proactive analyzer executed by a processor of a computing device, a compressed archive of executable code comprising a first item of executable code;
calculating, by the proactive analyzer, a hash of the compressed archive of executable code;
comparing, by the proactive analyzer, the calculated hash of the compressed archive of executable code to a database of hashes;
determining, by the proactive analyzer, that the calculated hash of the compressed archive of executable code does not match any hash in the database of hashes;
responsive to the determination that the calculated hash of the compressed archive of executable code does not match any hash in the database of hashes, decompressing, by the proactive analyzer, the compressed archive of executable code and extracting the first item of executable code;
calculating, by the proactive analyzer, a hash of the first item of executable code;
comparing, by the proactive analyzer, the calculated hash of the first item of executable code to the database of hashes;
determining, by the proactive analyzer, that the calculated hash of the first item of executable code does not match any hash in the database of hashes;
responsive to the determination that the calculated hash of the first item of executable code does not match any hash in the database of hashes, applying, by the proactive analyzer, a first security policy to the first item of executable code, triggering of the first policy indicating that the first item of executable code should be blocked from execution;
determining, by the proactive analyzer, that the first item of executable code does not trigger the first security policy;
executing, by the computing device, the first item of executable code, responsive to the determination that the first item of executable code does not trigger the first security policy;
intercepting, by a reactive analyzer executed by the processor, a request initiated by the first item of executable code during execution;
determining, by the reactive analyzer, that the request matches a second security policy; and
responsive to the determination that the request matches the second security policy, blocking the request, by the reactive analyzer.

2. The method of claim 1, further comprising:
receiving, by the proactive analyzer, a second item of executable code;
comparing, by the proactive analyzer, a calculated hash of the second item of executable code to the database of hashes; and
executing, by the computing device, the second item of executable code, responsive to a determination that the calculated hash of the second item of executable code matches a hash in the database of hashes.

3. The method of claim 1, wherein applying the first security policy to the first item of executable code comprises comparing, by the proactive analyzer, the first item of executable code to one or more predetermined regular expressions.

4. The method of claim 1, wherein determining that the request matches the second security policy further comprises determining, by the reactive analyzer, that the request corresponds to a secure data source.

5. The method of claim 1, wherein blocking the request further comprises discarding the request, by the reactive analyzer.

6. A method for distributed system security, comprising:
receiving, by proactive analyzer executed by a processor of a computing device, a first item of executable code;
calculating, by the proactive analyzer, a hash of the first item of executable code;
comparing, by the proactive analyzer, the calculated hash to a database of hashes;
determining, by the proactive analyzer, that the calculated hash does not match any hash in the database of hashes;
responsive to the determination that the calculated hash does not match any hash in the database of hashes, applying, by the proactive analyzer, a first security policy to the first item of executable code, triggering of the first policy indicating that the first item of executable code should be blocked from execution,
wherein applying the first security policy to the first item of executable code comprises comparing, by the proactive analyzer, output targets of the first item of executable code to a predetermined set of secure targets;
determining, by the proactive analyzer, that the first item of executable code does not trigger the first security policy;
executing, by the computing device, the first item of executable code, responsive to the determination that the first item of executable code does not trigger the first security policy;
intercepting, by a reactive analyzer executed by the processor, a request initiated by the first item of executable code during execution;
determining, by the reactive analyzer, that the request matches a second security policy; and
responsive to the determination that the request matches the second security policy, blocking the request, by the reactive analyzer.

7. A method for distributed system security, comprising:
receiving, by proactive analyzer executed by a processor of a computing device, a first item of executable code;
calculating, by the proactive analyzer, a hash of the first item of executable code;
comparing, by the proactive analyzer, the calculated hash to a database of hashes;
determining, by the proactive analyzer, that the calculated hash does not match any hash in the database of hashes;
responsive to the determination that the calculated hash does not match any hash in the database of hashes, applying, by the proactive analyzer, a first security policy to the first item of executable code, triggering of the first policy indicating that the first item of executable code should be blocked from execution;
determining, by the proactive analyzer, that the first item of executable code does not trigger the first security policy;
executing, by the computing device, the first item of executable code, responsive to the determination that the first item of executable code does not trigger the first security policy;
monitoring, by the reactive analyzer, an execution stack trace of a secure application executed by the processor of the computing device;
intercepting, by a reactive analyzer executed by the processor, a request initiated by the first item of executable code during execution, responsive to the execution stack trace comprising data from the first item of executable code;
determining, by the reactive analyzer, that the request matches a second security policy; and
responsive to the determination that the request matches the second security policy, blocking the request, by the reactive analyzer.

8. A method for distributed system security, comprising:
receiving, by proactive analyzer executed by a processor of a computing device, a first item of executable code;
calculating, by the proactive analyzer, a hash of the first item of executable code;
comparing, by the proactive analyzer, the calculated hash to a database of hashes;
determining, by the proactive analyzer, that the calculated hash does not match any hash in the database of hashes;
responsive to the determination that the calculated hash does not match any hash in the database of hashes, applying, by the proactive analyzer, a first security policy to the first item of executable code, triggering of the first policy indicating that the first item of executable code should be blocked from execution;
determining, by the proactive analyzer, that the first item of executable code does not trigger the first security policy;
executing, by the computing device, the first item of executable code, responsive to the determination that the first item of executable code does not trigger the first security policy;
intercepting, by a reactive analyzer executed by the processor, a request initiated by the first item of executable code during execution;
determining, by the reactive analyzer, that the request corresponds to a secure data source;
responsive to the determination that the request corresponds to the secure data source, blocking the request, by the reactive analyzer, by:
 intercepting, by the reactive analyzer, a response to the request initiated by the first item of executable code;
 filtering, by the reactive analyzer, data from one or more portions of the response to the request according to a predetermined pattern; and
 providing, by the reactive analyzer, the filtered response to the first item of executable code during execution.

9. A system for distributed system security, comprising:
a computing device comprising a processor executing a proactive analyzer and a reactive analyzer;
wherein the proactive analyzer is configured to:
 receive a compressed archive of executable code comprising a first item of executable code,
 calculate a hash of the compressed archive of executable code,
 compare the calculated hash of the compressed archive of executable code to a database of hashes,
 determine that the calculated hash of the compressed archive of executable code does not match any hash in the database of hashes,
 responsive to the determination that the calculated hash of the compressed archive of executable code does not match any hash in the database of hashes, decompress the compressed archive of executable code and extract the first item of executable code,
 calculate a hash of the first item of executable code,
 compare the calculated hash of the first item of executable code to the database of hashes,
 determine that the calculated hash of the first item of executable code does not match any hash in the database of hashes,
 responsive to the determination that the calculated hash of the first item of executable code does not match any hash in the database of hashes, apply a first security policy to the first item of executable code, triggering of the first policy indicating that the first item of executable code should be blocked from execution, and
 determine that the first item of executable code does not trigger the first security policy; and
wherein the reactive analyzer is configured to:
 intercept a request initiated by the first item of executable code during execution, execution of the first item of executable code initiated responsive to the determination that the first item of executable code does not trigger the first security policy,
 determine that the request matches a second security policy, and
 responsive to the determination that the request matches the second security policy, block the request.

10. The system of claim 9, wherein the proactive analyzer is further configured to:
receive a second item of executable code;
compare a calculated hash of the second item of executable code to the database of hashes; and
initiate execution of the second item of executable code, responsive to a determination that the calculated hash of the second item of executable code matches a hash in the database of hashes.

11. The system of claim 9, wherein the proactive analyzer is further configured to compare the first item of executable code to one or more predetermined regular expressions.

12. The system of claim 9, wherein the reactive analyzer is further configured to determine that the request corresponds to a secure data source.

13. The system of claim 9, wherein the reactive analyzer is further configured to discard the request.

14. A system for distributed system security, comprising:
a computing device comprising a processor executing a proactive analyzer and a reactive analyzer;
wherein the proactive analyzer is configured to:
 receive a first item of executable code,
 calculate a hash of the first item of executable code,
 compare the calculated hash to a database of hashes,
 determine that the calculated hash does not match any hash in the database of hashes,
 responsive to the determination that the calculated hash does not match any hash in the database of hashes, apply a first security policy to the first item of executable code, triggering of the first policy indicating that the first item of executable code should be blocked from execution, the first security policy comparing output targets of the first item of executable code to a predetermined set of secure targets,
 determine that the first item of executable code does not trigger the first security policy; and
wherein the reactive analyzer is configured to:
 intercept a request initiated by the first item of executable code during execution, execution of the first item of executable code initiated responsive to the determination that the first item of executable code does not trigger the first security policy,
 determine that the request matches a second security policy, and responsive to the determination that the request matches the second security policy, block the request.

15. A system for distributed system security, comprising:
a computing device comprising a processor executing a proactive analyzer and a reactive analyzer;
wherein the proactive analyzer is configured to:
   receive a first item of executable code,
   calculate a hash of the first item of executable code,
   compare the calculated hash to a database of hashes,
   determine that the calculated hash does not match any hash in the database of hashes,
   responsive to the determination that the calculated hash does not match any hash in the database of hashes, apply a first security policy to the first item of executable code, triggering of the first policy indicating that the first item of executable code should be blocked from execution, and
   determine that the first item of executable code does not trigger the first security policy; and
wherein the reactive analyzer is configured to:
   monitor an execution stack trace of a secure application executed by the processor of the computing device,
   intercept a request initiated by the first item of executable code during execution, responsive to the execution stack trace comprising data from the first item of executable code, execution of the first item of executable code initiated responsive to the determination that the first item of executable code does not trigger the first security policy,
   determine that the request matches a second security policy, and
   responsive to the determination that the request matches the second security policy, block the request.

16. A system for distributed system security, comprising:
a computing device comprising a processor executing a proactive analyzer and a reactive analyzer;
wherein the proactive analyzer is configured to:
   receive a first item of executable code,
   calculate a hash of the first item of executable code,
   compare the calculated hash to a database of hashes,
   determine that the calculated hash does not match any hash in the database of hashes,
   responsive to the determination that the calculated hash does not match any hash in the database of hashes, apply a first security policy to the first item of executable code, triggering of the first policy indicating that the first item of executable code should be blocked from execution, and
   determine that the first item of executable code does not trigger the first security policy; and
wherein the reactive analyzer is configured to:
   intercept a request initiated by the first item of executable code during execution, execution of the first item of executable code initiated responsive to the determination that the first item of executable code does not trigger the first security policy,
   intercept a response to the request initiated by the first item of executable code,
   filter data from one or more portions of the response to the request according to a predetermined pattern, and
   provide the filtered response to the first item of executable code during execution.

* * * * *